June 22, 1965
L. R. SULLIVAN
3,190,168
QUICK DETACHABLE FASTENING MEANS
Original Filed Jan. 25, 1960
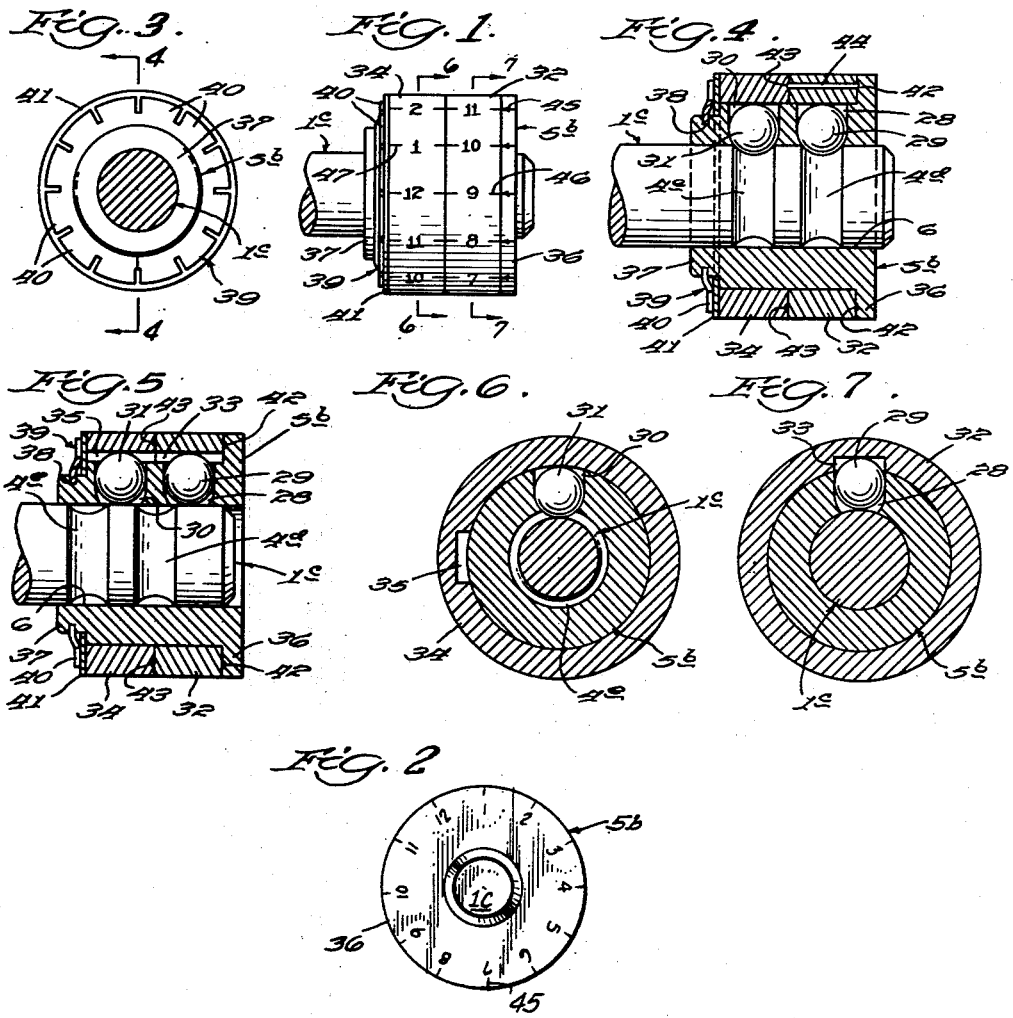
Inventor:
Leonard Ray Sullivan
By
Harold J. DeVisconte
Atty.

3,190,168
QUICK DETACHABLE FASTENING MEANS
Leonard Ray Sullivan, 911 Kenwood St., Burbank, Calif.
Original application Jan. 25, 1960, Ser. No. 4,495. Divided and this application Dec. 26, 1962, Ser. No. 248,831
2 Claims. (Cl. 85—7)

This application is a division of my prior application, Serial No. 4,495, filed January 25, 1960, now abandoned.

This invention relates to quick detachable fastening devices comprising a cylindrical bolt or stud component and a complementary removable surrounding collar means including a self-contained latch device operable by relative rotative movement of components of the said collar means to effect latching engagement and disengagement between it and the stud or bolt component. For the sake of simplified terminology hereinafter, the stud or bolt component will be called the "bolt," disregarding the absence of threads, and the associated collar means including the self-contained latching devices to be described will be referred to as the "collar."

The principal object of the invention is to provide a detachable fastening means comprising a cylindrical bolt having a plurality of latch means receiving areas of lesser radial dimension than the cylindrical surface of the bolt and an encircling collar device including a latch means operated by relative rotative movement between elements comprising said collar and resultant actuation of the latch means either to enter said latch means receiving areas on the bolt or to be released from such latching engagement to permit relative axial movement between the collar and bolt as in, for example, attachment and separation of the said components.

Another object of the invention is to provide a fastening means of the type referred to in the foregoing principal objective in which members of the collar component thereof are movable relatively rotatably about the axial line of the opening therein in which the bolt is received.

A further object of the invention is to provide a fastening means of the type set forth in the foregoing principal objective in which the collar thereof includes a plurality of relatively rotatable latch actuating members each constituting a rotatable dial whereby a plurality of latches may be operated with respect to a plurality of latch receiving areas on the bolt in the manner of a combination lock.

A still further object of the invention is to provide a fastening means such as set forth in any of the foregoing objectives in which the component parts are of simple construction, are readily assembled, and are simple and reliable in operation.

With the foregoing objects in view, together with such additional objects and advantages as may subsequently appear, the invention resides in the parts, and in the construction, combination and arrangement of parts described, by way of example, in the following specification of certain presently preferred embodiments of the invention, reference being had to the accompanying drawings which form a part of said specification and in which drawings:

FIG. 1 is a side elevational view of a bolt and collar means mounted thereon in which the collar means comprises a plurality of latching devices operated by rotatably moving collars mounted on the base element of the collar means and in which the latch operating means are numbered relatively to each other and to graduations on the base element as shown in FIG. 2 to effect a combination type of lock, FIG. 2 is a right hand elevational view of the base member of the form of the device shown in FIG. 1, FIG. 3 is an end elevational view taken on the line 3—3 of the left hand end of FIG. 1, FIGS. 4 and 5 are transverse medial sectional views taken on the line 4—4 of FIG. 3 and showing the device in locked and unlocked positions, respectively, and FIGS. 6 and 7 are views taken, respectively, on the lines 6—6 and 7—7 of FIG. 1 and showing one of the locking rings in latch releasing position and other of the rings in latch engaging position.

Referring to the drawings, there is shown an embodiment of the invention in which the shank of the bolt 1c is provided with closely spaced, parallel ball receiving grooves 4d and 4e. The base member 5b is provided with an internal bolt receiving bore 6 and the body thereof is provided with a first ball receiving hole 28 adapted to hold a ball 29 for engagement with the groove 4d and is further provided with a second radially extending hole 30 for a second ball 31 adapted to engage the groove 4e.

Rotatably mounted on the exterior of the base member 5b is a ring 32 having an internal notch 33 formed therein and adapted to serve, when aligned, as an extension of the bore 28 to afford clearance for the ball to move radially outward and out of the groove 4b as best shown in FIGS. 5 and 7. Also rotatably mounted on the exterior of the body member 5b adjacent to the ring 32 is a second rotatable ring 34 similarly having a clearance notch 35 formed on the inner periphery thereof and similarly affording clearance for the ball 31. The inner ends of the holes or bores 28 and 30 are similarly reduced in diameter to serve as retaining means for the respective balls mounted therein. The outer end of the base member 5b is provided with a head flange member 36 against which one side of the ring 32 engages. The opposite end of the base member 5b carries a reduced diameter hub 37 provided with a peripheral groove 38 in which a spring washer 39 is seated, said washer extending upwardly in a series of finger portions 40 and engaging a washer 41 which, in turn, contacts the end face of the ring 34 which is adjacent thereto. The spring 39 tends to yieldingly hold the rings 32 and 34 yieldingly against each other and against the under face of the head 36. The said under face of the head 36 is provided with a a series of indentations 42 and the confronting face of the ring 34 is similarly provided with a series of a radially spaced indentations 43. At one point in its diameter, the ring 32 is provided with a pin 44 extending therethrough and the ends of this pin form outward projections adapted to engage the indentations in the confronting faces of the ring 34 and the head 36 so that a ratcheting effect is attained.

The outer end face of the head portion 36 of the base member 5b is provided with a series of radially spaced numbers and corresponding indicia lines as indicated at 45 and the rings 32 and 34 are similarly provided with a series of spaced numbers and registering lines as shown at 46 and 47. For different assemblies, the relationship between the ball receiving notches 33 and 35 would be differently arranged with respect to the various numbers and also the holes 28 and 30 in the base member 5b would be differently arranged with respect to the numbers on the outer end thereof. It will be obvious that while as here shown, these holes are in the same line parallel to the axis of the bore therein, they need not be so related and can be at respectively different positions around the periphery of the base member. Thus, for example, as here shown with the holes 28 and 30 opposite the number 1 on the base member and with the number 12 on the ring 32 and the number 3 on the ring 34 in alignment, the device is in position to be placed on the bolt or removed therefrom. In any other rotative position of one or the other or of both of the rings relative to the base member, the device either cannot be put on the bolt or if it is on the bolt, it cannot be removed.

It will further be obvious that while only two operating rings are shown, there are three sets of twelve numerals each which would give a total of 1,728 possible combinations. If the numbers on these rings were increased to, say, 20 each, the possible combinations would be 8,000.

Thus, there has been created a fastening device in which one or more balls are positively moved radially inwardly into engagement with a groove in a bolt or stud component and are released to be freely movable out of that groove to permit relative endwise movement between the stud or bolt and the locking device thereon; the locking and release of the balls being achieved by relative rotary motion in predetermined increments between the components of the collar within which they are contained.

While in the foregoing specification, there has been disclosed a presently preferred embodiment of the invention, it will be appreciated that such disclosure is by way of example only and that the invention is not to be deemed to be limited to the exact forms thereof thus disclosed by way of example. Accordingly, it will be understood that the invention extends as well to all such changes and modifications in the parts, and in the construction, combination and arrangement of parts, as shall come within the purview of the appended claims.

I claim:

1. In a quick detachable fastener, a bolt having a first and a second peripheral groove spaced axially of each other and a collar component attachable to and detachable from said bolt by interlocking engagement with and release from said grooves; said collar component comprising a cylindrical base member having an axially disposed bolt receiving bore extending therethrough, a radially outwardly extending flange at one end thereof and an external cylindrical bearing surface adjacent to said flange, a first locking member retaining and guiding opening extending from said bearing surface to said bore adjacent to said flange, said opening terminating in said bore in a reduced diameter portion, a first locking member disposed in said first opening and adapted to project into said bore sufficiently to engage said first groove on said bolt, means for causing said locking member to effect locking engagement with said groove including a ring mounted for rotation on said bearing surface on said base member and having means for effecting movement of said locking member into locking engagement or to be released from such engagement and further having an end face engaging a complementary face of said flange, a second opening in said bearing surface spaced axially from said first opening at the same distance as said grooves in said bolt are spaced from each other, a second locking member in said second opening and a second rotatable ring mounted for rotation on said bearing surface and having similar means for effecting engagement and release of said second locking member with said second groove and having an end face engaging the end face of said first ring opposite the face thereof engaging said flange, spring means for holding said rings and said collar component in engagement with each other and with said flange with capacity for limited axial movement and comprising a spring washer mounted on the end of said collar component at the end thereof remote from said flange and having a plurality of generally radially outwardly extending fingers terminating in ends displaced toward said flange and engaging the face of said second ring remote from said first ring with resultant creation of capacity for limited axial movement of said rings against the bias of said spring fingers, and ratchet means operated by said bias of said spring washer for displaceably retaining said rings in predetermined increments of movement relative to each other and to said flange comprising a first ratchet means on the juxtaposed faces of said first ring and said flange, a second ratchet means on the juxtaposed faces of said first and second rings, each of said first and second ratchet means comprising a plurality of circumferentially spaced depressions formed in one of the juxtaposed faces and at least one protuberance on the other juxtaposed face engageable selectively with said plurality of depressions on the other juxtaposed face under the influence of said spring means.

2. A fastening device as claimed in claim 1 in which said depressions are formed respectively in the faces of said flange and said second ring and in which a pin extends through said first ring parallel to the axial line thereof with the ends of said pin projecting beyond the opposite faces of said first ring to form said protuberances.

References Cited by the Examiner

UNITED STATES PATENTS

| | | | |
|---|---|---|---|
| 1,706,994 | 3/29 | Beck | 70—312 |
| 2,006,833 | 7/35 | Jensen | 285—277 |
| 2,135,223 | 11/38 | Scheiwer | 285—277 |
| 2,577,319 | 12/51 | Feitl | 85—8.8 |
| 2,739,615 | 3/56 | Wurzel | 85—8.8 |
| 2,788,243 | 4/57 | Goodliffe et al. | 285—277 |

FOREIGN PATENTS

| | | |
|---|---|---|
| 88,757 | 6/22 | Austria. |
| 1,037,089 | 4/53 | France. |
| 702,932 | 1/54 | Great Britain. |
| 183,930 | 3/36 | Switzerland. |

CARL W. TOMLIN, *Primary Examiner.*

EDWARD C. ALLEN, *Examiner.*